(12) United States Patent
Sluiter et al.

(10) Patent No.: US 8,169,908 B1
(45) Date of Patent: May 1, 2012

(54) METHOD FOR DISCARDING CORRUPTED DATA PACKETS IN A RELIABLE TRANSPORT FABRIC

(75) Inventors: David Sluiter, Superior, CO (US); David Thomas, Wellington, CO (US); Mark Buchanan, Fort Collins, CO (US); Timothy Thompson, Windsor, CO (US); Christopher Paulson, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 947 days.

(21) Appl. No.: 10/905,998

(22) Filed: Jan. 29, 2005

(51) Int. Cl.
*H04L 1/00* (2006.01)
(52) U.S. Cl. ......................... 370/235; 709/237
(58) Field of Classification Search .................. 370/235; 709/237, 230
See application file for complete search history.

(56) References Cited

U.S. PATENT DOCUMENTS

| | | | | |
|---|---|---|---|---|
| 2002/0141414 A1* | 10/2002 | Rezaiifar et al. | .............. | 370/394 |
| 2003/0005382 A1* | 1/2003 | Chen et al. | .................. | 714/748 |
| 2003/0063583 A1* | 4/2003 | Padovani et al. | .............. | 370/329 |
| 2003/0120802 A1* | 6/2003 | Kohno | ........................... | 709/237 |
| 2003/0128716 A1* | 7/2003 | Harris et al. | .................. | 370/450 |
| 2004/0184471 A1* | 9/2004 | Chuah et al. | .................. | 370/420 |
| 2004/0260824 A1* | 12/2004 | Berard et al. | ................. | 709/230 |

OTHER PUBLICATIONS

Andrew S. Tanenbaum "Computer Networks", 2003, p. 389.*

* cited by examiner

*Primary Examiner* — Jianye Wu
(74) *Attorney, Agent, or Firm* — Christopher P. Maiorana, PC (57) ABSTRACT

A method for discarding perpetually-rejected packets in a fabric-based interconnect having a reliable physical layer is disclosed. A transmitting component keeps a count of the number of negative acknowledgements (NAKs) it receives from the receiving component for packets the transmitting component sends. If the transmitting component receives a number of consecutive NAKs for the same packet that exceeds some pre-determined threshold, the packet is not resent, but is, instead, treated as having been acknowledged, and subsequent packets are allowed to be transmitted. Higher-level processes are then notified of the problem so as to allow the error to be dealt with at a higher level, but without obstructing the flow of packets on the physical layer.

21 Claims, 6 Drawing Sheets

METHOD FOR DISCARDING CORRUPTED DATA PACKETS IN A RELIABLE TRANSPORT FABRIC

TECHNICAL FIELD

The present invention relates generally to fabric-based interconnects in data processing systems. Specifically, the present invention is directed to a method of fault recovery for use in a fabric-based interconnect having a reliable physical layer.

BACKGROUND ART

Electronic systems typically rely on buses to transfer data between components. A bus is a signal route to which system components are connected in parallel so that signals can be passed between them. Although buses are relatively convenient from an implementation standpoint, the bus paradigm has a number of drawbacks. First, because buses connect multiple components in parallel, much time must be spent arbitrating between different components wishing to access the bus. Second, traditional bus systems typically do not allow a user to add or remove a component to/from the system while the system is operating, due to the fact that all of the components on the bus are connected electrically to each other in parallel.

A recent industry trend has been to move away from the traditional bus method of intra-system communication/interconnection. Fabric-based interconnects have begun to replace the traditional bus system. In a fabric-based interconnect, components communicate through a packet-switched network (fabric) of dedicated point-to-point connections, rather than through a shared bus. Advantages of this approach are that it obviates the need for costly (in terms of performance) bus arbitration protocol and that it makes it possible to "hot-swap" components (i.e., connect or disconnect components while the system is operating).

INFINIBAND® and RAPIDIO™ are two examples of industry-standard fabric-based interconnects. INFINIBAND® is designed primarily to replace backplane buses, such as PCI (Peripheral Component Interconnect) buses, which connect computer systems to external peripherals such as disk drives or other storage devices (a network of this kind is generally referred to as a system area network or, if used for storage, a storage area network, and abbreviated as SAN). RAPIDIO™, on the other hand, is intended for use as an "on-board" or "in-box" interconnect for connecting integrated circuits (such as microprocessors) or other closely-related system components, so as to replace system buses and other intermediate-level interconnects.

The RAPIDIO™ standard is a three-level protocol (compare to the seven-layer OSI [open systems interconnection] model for networking). The layers of the RAPIDIO™ model, from bottom to top, consist of a physical layer, a transport layer, and a logical layer. The logical layer provides an interface with higher-level processes, including system- and user-level software, where applicable. The transport layer handles the task of routing packets from a source to a destination. The physical layer has the ultimate responsibility of moving packets between physical devices. In order to achieve a high level of transparency to higher-level processes, RAPIDIO™ utilizes a "reliable" physical layer protocol. In other words, the RAPIDIO™ physical layer is responsible for insuring that packets are received at their destination without error.

One of the peculiarities of the RAPIDIO™ standard is that when an error occurs at the physical layer and a packet is not accepted by the receiver, the transmitter retries both the unaccepted packet and all packets of equal or lesser priority transmitted subsequent to the unaccepted packet. This can cause a problem, because it sometimes happens that a packet is repeatedly rejected, due to some corruption of the packet itself or unexpected change of operating conditions (e.g., if a RAPIDIO™ device starts rejecting specific classes of packets based on a configuration bit). The result in these instances is that the rejected data packet is perpetually rejected, and all subsequent packets of equal or lesser priority are held up by a potentially infinite loop of packet retries. The way this is dealt with is that a higher-level process must detect the problem through the expiration of a timeout period, then attempt to correct the problem through software. This process can have a devastating effect on system performance, due to the fact that entire classes of packets are stalled within the system until the expiration of some timeout.

What is needed, therefore, is a method of detecting these potentially corrupted packets at the physical layer, so as to reduce the inefficiency associated with relying on a timeout at a higher logical layer to initiate error recovery. The present invention provides a solution to these and other problems, and offers other advantages over previous solutions.

SUMMARY OF THE INVENTION

A preferred embodiment of the present invention provides a method for discarding perpetually-rejected packets in a fabric-based interconnect having a reliable physical layer. A transmitting component keeps a count of the number of negative acknowledgements (NAKs) it receives from the receiving component for packets the transmitting component sends. If the transmitting component receives a number of consecutive NAKs for the same packet that exceeds some pre-determined threshold, the packet is not resent, but is, instead, treated as having been acknowledged, and subsequent packets are allowed to be transmitted. Higher-level processes are then notified of the problem so as to allow the error to be dealt with at a higher level, but without obstructing the flow of packets on the physical layer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
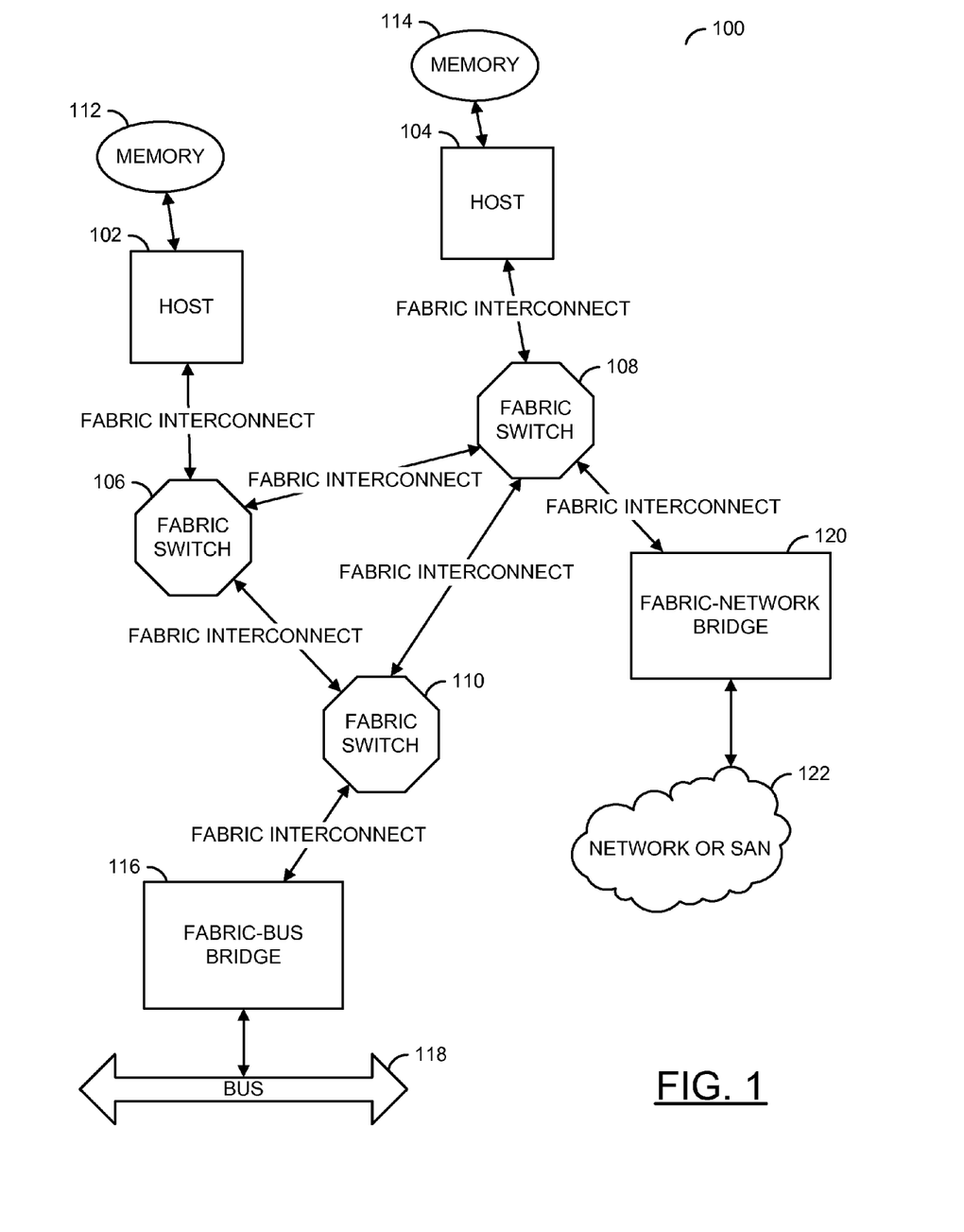
FIG. 1 is a diagram of a system employing a fabric-based interconnect in accordance with a preferred embodiment of the present invention.

FIG. 1 is a diagram of a system 100 employing a fabric-based interconnect in accordance with a preferred embodiment of the present invention. In this preferred embodiment, the RAPIDIO™ interconnect standard is utilized. System 100 comprises a plurality of system components, referred to as "hosts" 102 and 104. Hosts 102 and 104 represent any of a virtually limitless number of possible system components, such as processors, peripheral devices or device controllers, communication interfaces, and the like, which may be interfaced together through the use of a fabric-based interconnect. The fabric-based interconnect itself is supported by a plurality of fabric switches 106, 108, and 110, which switch packets along routing paths made up of point-to-point connections 111, which link fabric switches 106, 108, and 110 to each other, as well as to other components within system 100. Each of point-to-point connections 111 supports full duplex send/receive of packetized data, through either a serial or parallel interface (RAPIDIO™ support both).

Since RAPIDIO™ is intended to replace system bus structures as a means of providing "in-box" connectivity between system components, RAPIDIO™ provides built-in support for distributed shared memory (DSM) among RAPIDIO™-connected components (thus maintaining the appearance of a global address space within system 100, as would be the case if the various memories in system 100 were connected to a common bus structure). Thus, as shown in FIG. 1, host 102 and host 104, which might represent a processor and a peripheral device card, for example, possess their own respective memories 112 and 114, which may be addressed via RAPIDIO™. Communication with "out-of-the-box" peripheral devices and legacy hardware is supported through the use of fabric-bus bridge 116 and fabric-network bridge 120, which connect the RAPIDIO™ interconnection domain of system 100 with a conventional bus 118 (such as a backplane bus for use with legacy PCI cards, for example) and a network or SAN 122 (such as an Ethernet or an Infiniband® fabric), respectively.

Figure 2:
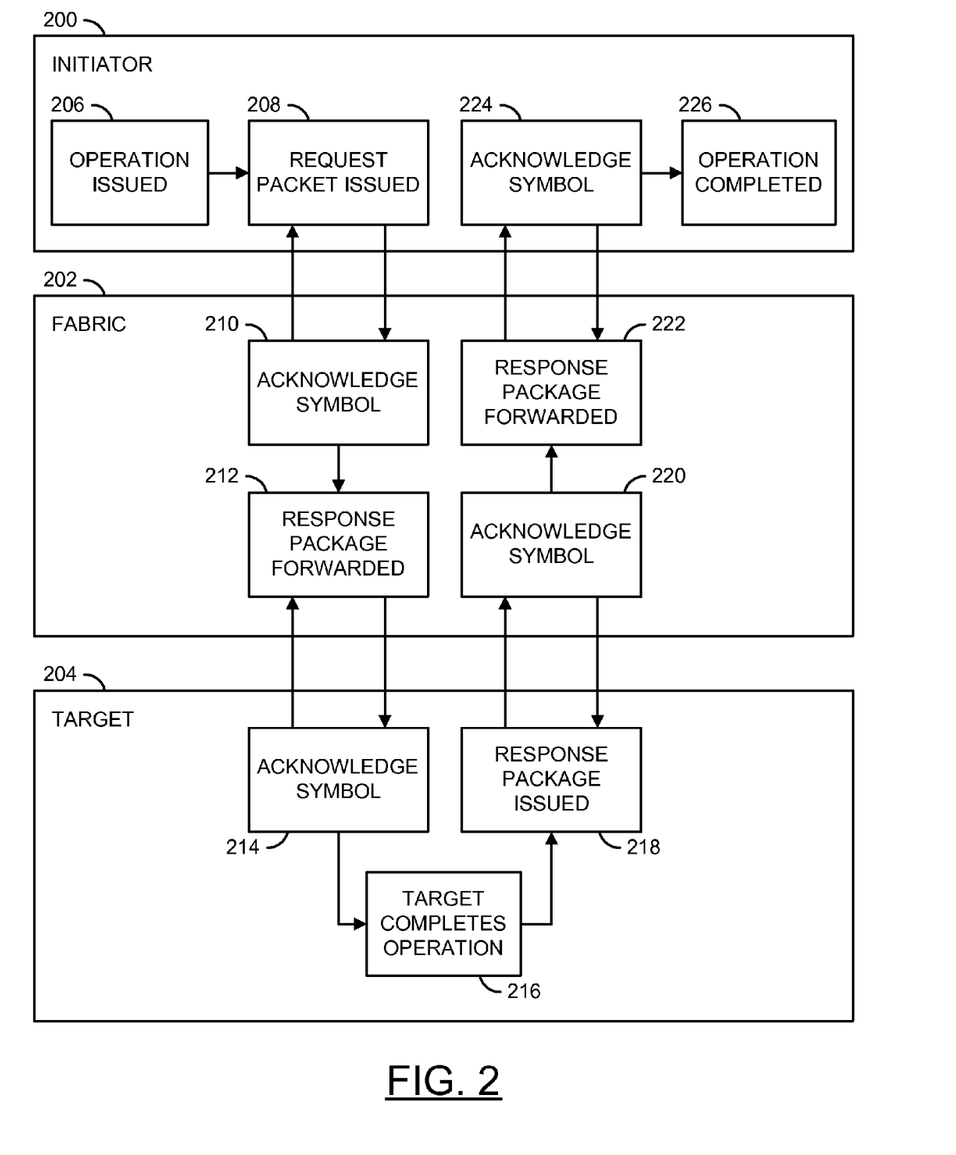
FIG. 2 is a diagram illustrating a process of sending and receiving request and response packets in a fabric-based interconnect in accordance with a preferred embodiment of the present invention.

FIG. 2 is a diagram illustrating a process of sending and receiving request and response packets in a fabric-based interconnect in accordance with a preferred embodiment of the present invention. The process illustrated in FIG. 2 is representative of the manner in which packets are generally transmitted and received in a RAPIDIO™ interconnect fabric, where each transmission of a packet over a point-to-point connection is confirmed with an acknowledgement returned to the transmitter from the receiving component. At this point it should be noted that although FIG. 2 illustrates a transaction that includes both a request and a response, not all RAPIDIO™ transactions will include both requests and responses. FIG. 2 illustrates an initiator component 200 requesting that an operation be performed by a target component 204. In this example, the requests and responses are routed through a single fabric switch 202; however, in an actual embodiment, packets may be routed through more complex paths through multiple fabric switches, according to the connection topology of the system in question.

Turning now to the process illustrated in FIG. 2, initiator 200 first issues an operation (block 206). This results in a physical-layer packet being issued by initiator 200 (block 208) and transmitted over a point-to-point link to fabric switch 202. Upon correct reception of the packet, fabric switch 202 issues an acknowledge symbol (a type of packet, as described in FIGS. 3A and 3B and accompanying text) to initiator 200 (block 210).

Fabric switch 202 then forwards the request packet to target 204 according to the destination address specified in the packet (block 212). Target 204, upon correctly receiving the packet, returns an acknowledgement symbol to fabric switch 202 to confirm the reception (block 214). Target 204 then performs the operation requested in the request packet (block 216) and issues a response packet containing the result of performing the requested operation (block 218), which, again, is routed through fabric switch 202.

Upon correctly receiving the response packet, fabric switch 202, returns an acknowledgement symbol (block 220), and forwards the response packet to initiator 200. Initiator 200 then sends its own acknowledgement symbol to fabric 202 to confirm its reception of the response packet (block 224). This marks the completion of the operation (block 226).

As described with reference to FIG. 2, there are two fundamental units of data transmission utilized in RAPIDIO™, packets for carrying data payloads, and command symbols, for transmitting command information. As was already mentioned, one of these control symbols is a "packet-accepted" or "acknowledgement" symbol (here abbreviated as "ACK") that denotes that a packet was properly received by a receiver. There is also a "packet-not-accepted" or "negative-acknowledgement" symbol (here abbreviated as "NAK"), which indicates that a packet was received but cannot be accepted, either because the packet is corrupted or because of other conditions that preclude the packet's being accepted.

Figure 3A:
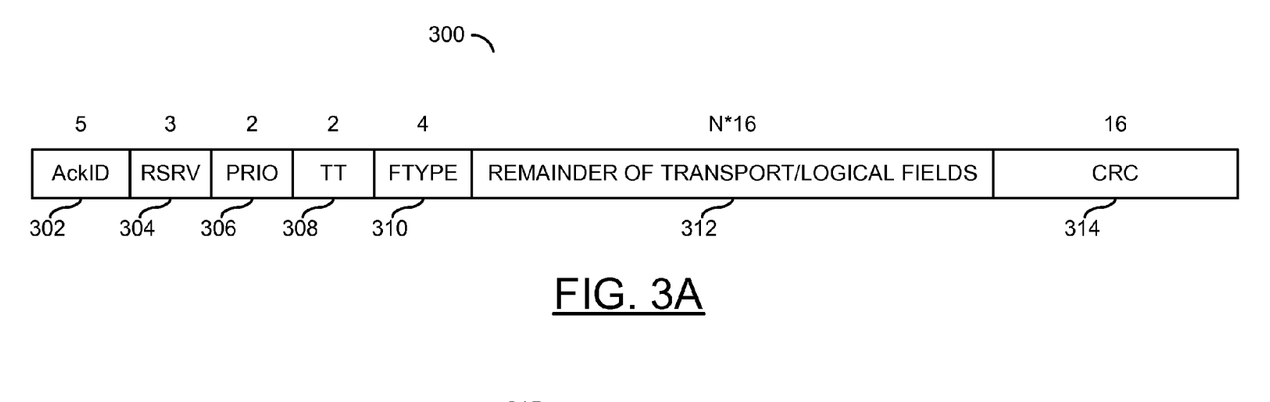
FIG. 3A is a diagram illustrating a packet format used in a fabric-based interconnect in accordance with a preferred embodiment of the present invention.

FIG. 3A is a diagram of a serial RAPIDIO™ packet 300 as used in a preferred embodiment of the present invention (there is also a parallel packet format, which differs from the packet format shown here for illustration). In FIG. 3A, packet 300 is shown with various data fields from the physical and transport layers of the rapid I/O protocol. Starting with the first of these fields, field 302 is the ackID or acknowledgment ID field, which is a five bit number that distinguishes packet 300 from other packets. When a packet is received, the receiver stands an acknowledgment having an ackID field that matches the ackID field of the packet. Field 304 consists of three bits of reserved space (set to zero). Field 306 is a 2-bit number that represents the priority of packet 300 and as compared to other packets being transmitted over the same connection. Field 308, the TT field, indicates a type of transport address mechanism used and is just used by the transport layer of the rapid I/O framework. Ftype field 310 is a 4-bit field that represents the type of transaction to which packet 300 pertains, either as a request packet or a response packet. The remaining packet fields 312, which all belong to the transport and logical layers, follow Ftype field 310 and have a size that is a multiple of 16 bits. The last data field in packet 300, CRC Field 314, is a 16-bit cyclic redundancy check the value that is used to detect errors in transmission or reception of packet 300. Specifically, the 16-bit CRC that is used is based on the ITU polynomial $X^{16}+X^{12}+X^5+1$.

Figure 3B:
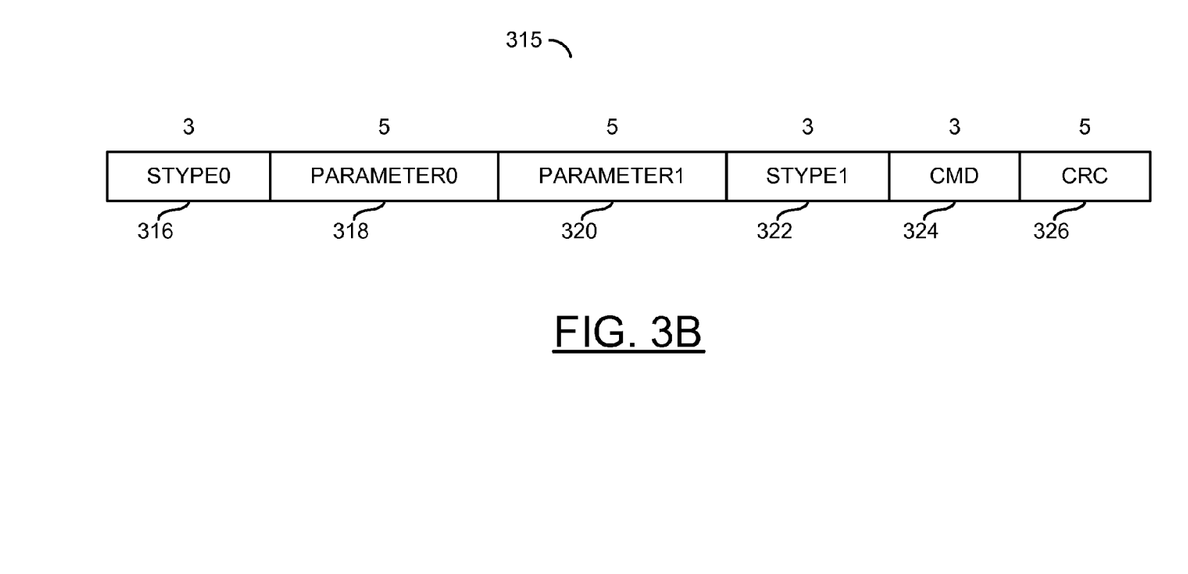
FIG. 3B is a diagram illustrating differences in the packet format of FIG. 3A when the packet is used for transmitting a control symbol, rather than for data payload, in a fabric-based interconnect in accordance with a preferred embodiment of the present invention.

FIG. 3B is a diagram of a command symbol 315 as used in a preferred embodiment of the present invention. Command symbol 315 begins with Stype0 field 316, which represents the type of control symbol being sent, such as a packet-accepted symbol (ACK) or a packet-not-accepted symbol (NAK). Two 5-bit parameter fields 318 and 320 immediately follow Stype0 field 316 and provide additional information for interpreting Stype0 field 316. Stype1 field 322 follows parameter field 320 and represents a subtype for command symbol 315. A 3-bit command field 324 follows as type 1 field 322. Finally, a five bit CRC Field 326 is the last field in command symbol 315. This 5-bit CRC is based on the ITU polynomial $X^5+X^4+X^2+1$.

Figure 4:
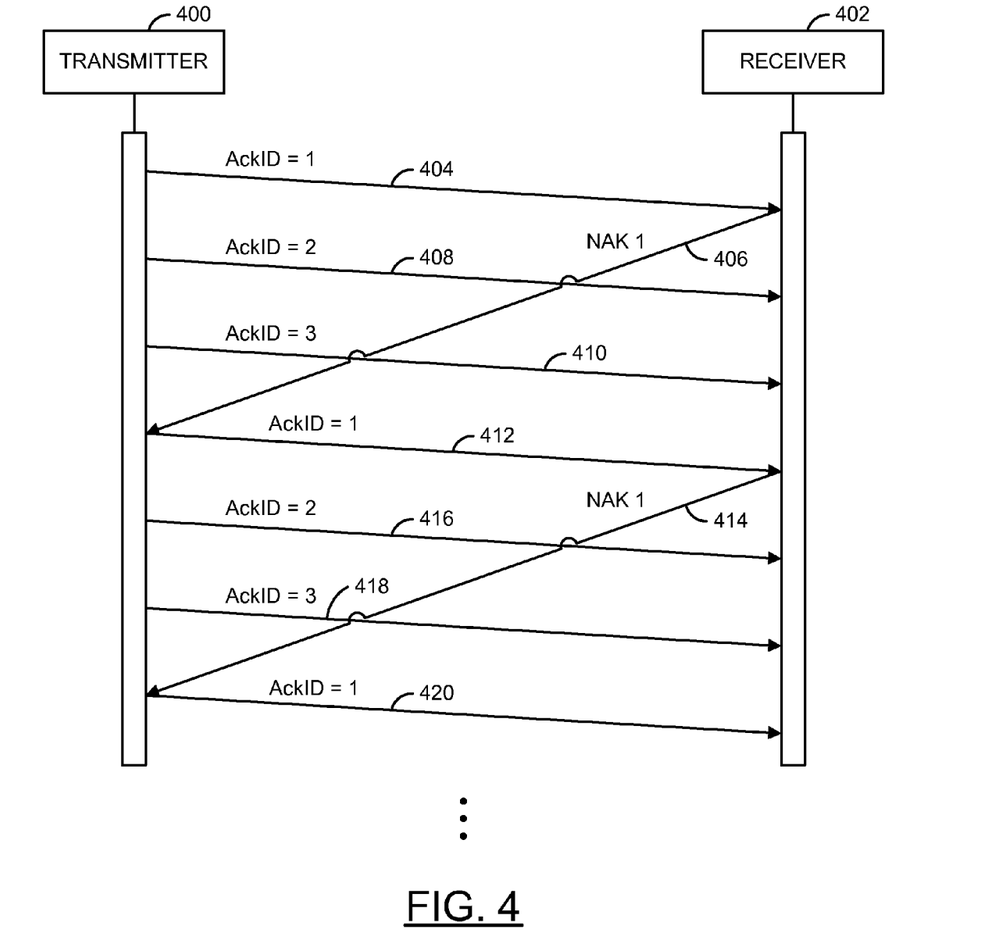
FIG. 4 is a sequence diagram illustrating the phenomenon of a perpetual retry in a fabric-based interconnect.

FIG. 4 is a sequence diagram illustrating the phenomenon of a perpetual retry in a fabric-based interconnect. According to the RAPIDIO™ specification, when the receiver of a packet sends a negative acknowledgement symbol (NAK) to the transmitter to inform the transmitter that the packet was not accepted, all packets of equal or lesser priority are blocked by the transmitter, which resends the packet that was not accepted, as well as the subsequent packets. If the packet that was not accepted is somehow corrupted or is such that the receiver will never be able to accept the packet, an infinite looping condition may result. FIG. 4 provides an example of this phenomenon.

FIG. 4 shows a transmitter 400 sending a first packet (AckID=1) to receiver 402 (send arrow 404). At receiver 402, the packet is not accepted, so a negative acknowledgement symbol is sent to transmitter 400 (send arrow 406). Meanwhile, transmitter 400 continues to send the second (AckID=2) and third (AckID=3) packets to receiver 402 (send arrows 408 and 410).

When transmitter 400 receives the negative acknowledgement from receiver 402, transmitter 400 begins to retry the first packet (AckID=1) and the other subsequent packets (send arrows 412, 416, and 420). Receiver 402, unable to accept the retried packet, will send another negative acknowledgement (send arrow 414), and the process begins to cycle through another iteration (send arrow 420). As can be seen from FIG. 4, this process can continue indefinitely or until some higher-level process (such as an operating system) determines that some timeout period for receiving data has expired.

Figure 5:
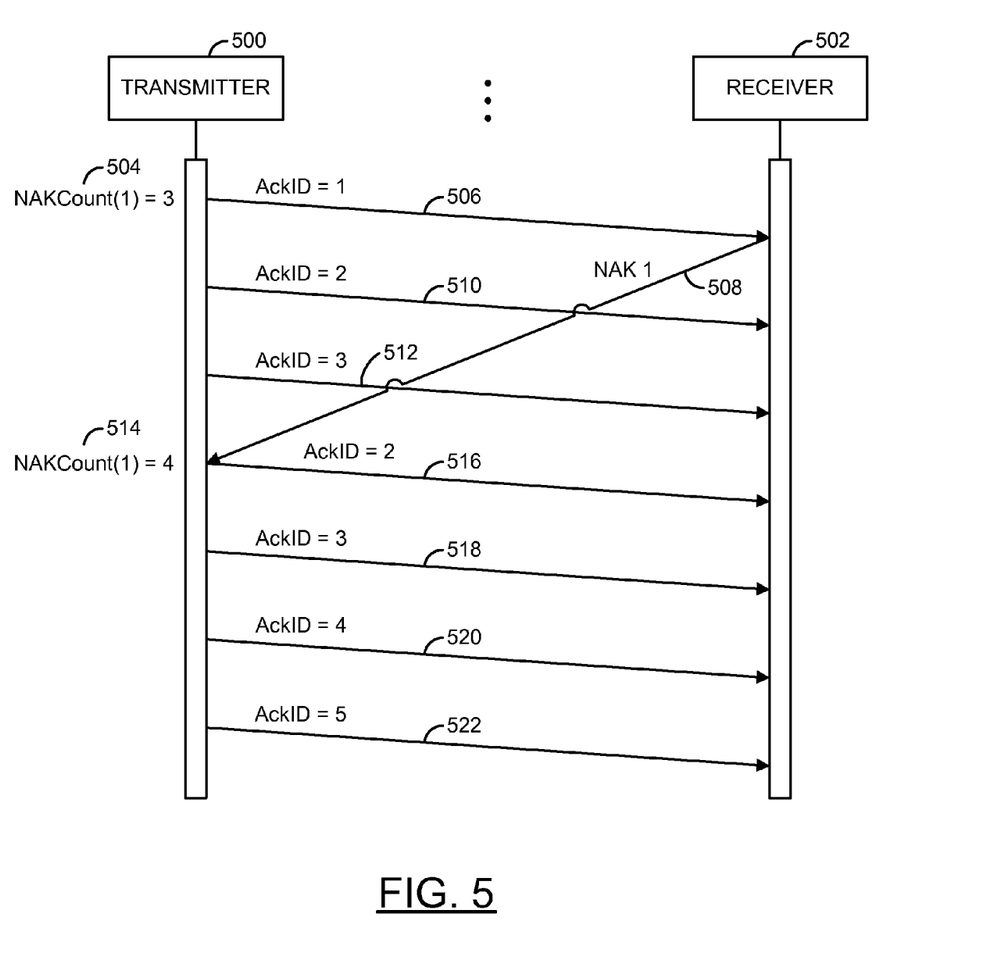
FIG. 5 is a sequence diagram illustrating the use of selective packet discard in a fabric-based interconnect in accordance with a preferred embodiment of the present invention.

A preferred embodiment of the present invention detects when one of these perpetually rejected packets has been transmitted and selectively discards the perpetually rejected packet to ensure that packet flow continues. FIG. 5 is a sequence diagram illustrating the use of selective packet discard in a fabric-based interconnect in accordance with a preferred embodiment of the present invention. In a preferred embodiment of the present invention, a count (NAKCount) of the number of consecutive NAKs for a given packet is kept. In the example of FIG. 5, the NAKCount (which corresponds to packet 1) is 3 (NAKCount 504) at the time that send 506 of packet 1 commences. When the negative acknowledgment is received from receiver 502 (head of send arrow 508), the NAKCount is incremented to 4 (NAKCount 514).

According to a preferred embodiment of the present invention, when the number of consecutive negative acknowledgments (NAKs) for a given packet exceeds a predefined threshold, the transmitter treats the packet as if it had received an acknowledgment from the receiver, and proceeds with transmitting subsequent packets. Hence, in FIG. 5, transmitter 500, after receiving 4 NAKs from receiver 502, proceeds to transmit packets 2, 3, 4, 5, and so on (send arrows 516, 518, 520, and 522).

Of course, this means that packet 1 has been discarded, and the data it contained has been lost. Handling this problem, however, is the job of higher-level processes, which are concerned with particular data transmissions, rather than with simply maintaining an infrastructure for transmitting and receiving data. Nonetheless, since transmitter 500 is aware that the packet has been discarded, transmitter 500 may notify higher-level processes and receiver 502 of the error by transmitting a notification message on an auxiliary port.

One of ordinary skill in the art will also appreciate that many variations on this scheme may be applied without departing from the scope and spirit of the present invention. For example, in addition to a NAKCount threshold, other conditions may be utilized to determine when to discard a particular packet, such as the type or priority of the packet. For example, packets of low priority might be discarded after fewer NAKs than higher priority packets. As another example, when transmitter 500 is aware that a packet is corrupted (due to a bad CRC, for instance), transmitter 500 can discard the packet sooner, after one NAK, for instance.

Figure 6:
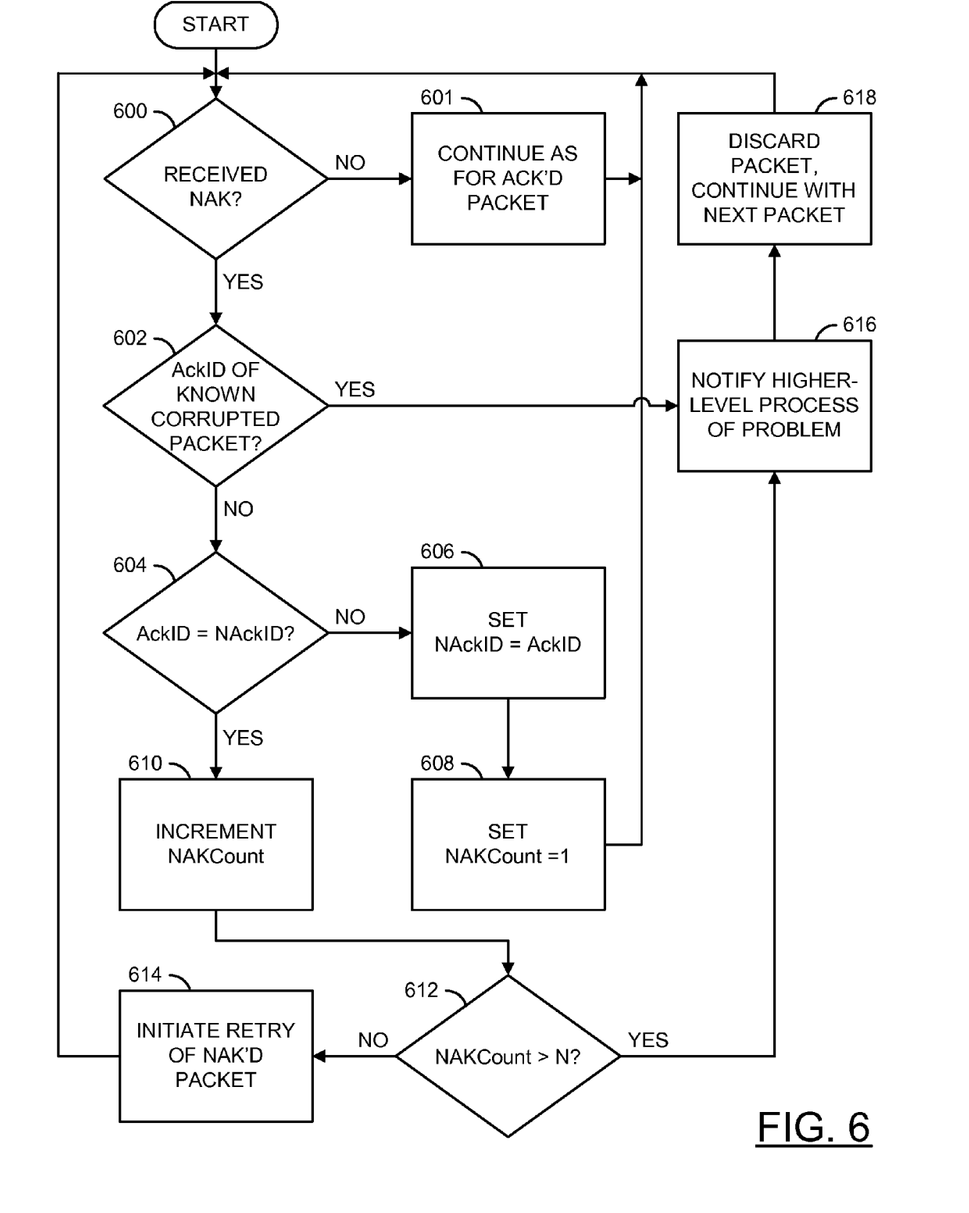
FIG. 6 is a flowchart representation of a process of applying selective packet discard as a means of fault recovery in the physical layer of a fabric-based interconnect in accordance with a preferred embodiment of the present invention.

FIG. 6 is a flowchart representation of a process of a transmitter's applying selective packet discard as a means of fault recovery in the physical layer of a fabric-based interconnect in accordance with a preferred embodiment of the present invention. First, a determination is made as to whether a NAK has been received from the receiver (block 600). If not (block 600:No), processing continues as for an acknowledged packet (block 601), and the process cycles back to block 600. If a NAK has been received (block 600:Yes), a determination is made as to whether the AckID corresponding to the NAK is that of a known corrupted packet (block 602). If so (block 602:Yes), then higher-level process(es) is/are notified about the problem to allow corrective action to be taken (block 616). Next, the packet is discarded and the transmitter proceeds transmit the next packet (block 618).

If the AckID was not for a known corrupted packet (block 602:No), then a determination is made as to whether the AckID was the same as the last AckID for which a NAK was received (NAckID) (block 604). If not (block 604:No), then NAckID is set to the current NAK's AckID (block 606), NAKCount is set to 1 (block 608), and the process cycles back to block 600.

If the AckID was the same as the last AckID for which a NAK was received, then NAKCount is incremented (block 610), and a determination is made as to whether NAKCount is greater than a predetermined threshold N (block 612). If so (block 612:Yes), the process branches to block 616, higher-level process(es) is/are notified about the problem, the packet is discarded and the transmitter proceeds to transmit the next packet in sequence(block 618). If NAKCount does not exceed the predetermined threshold (block 612:No), then a retry of the NAK'd packet is initiated and the process cycles back to block 600.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A method comprising:
   (A) transmitting a particular packet followed by a plurality of subsequent packets from an apparatus through a network to a receiver, wherein (i) the particular packet and the subsequent packets form a sequence of packets and (ii) the particular packet as transmitted is associated with a first identification;
   (B) receiving a negative acknowledgment at the apparatus from the receiver after the sequence of packets has been sent, wherein the negative acknowledgment is associated with a second identification, the second identification indicating that the particular packet was not accepted by the receiver;
   (C) comparing the first identification with the second identification in the apparatus;
   (D) incrementing with the apparatus a number of negative acknowledgments where the comparing indicates that the first identification matches the second identification;
   (E) if the number of negative acknowledgments exceeds a predefined threshold, re-transmitting the subsequent packets from the apparatus to the receiver without re-transmitting the particular packet; and
   (F) if the number of negative acknowledgments does not exceed the predefined threshold, re-transmitting the sequence of packets with the particular packet from the apparatus to the receiver, wherein the predefined threshold (i) is stored in the apparatus and (ii) has a value based on a priority of the particular packet.

2. The method of claim 1, wherein the number of negative acknowledgments comprises a count of consecutive negative acknowledgments concerning the particular packet that have been received by the apparatus.

3. The method of claim 1, wherein the network comprises a fabric-based interconnect.

4. The method of claim 1, further comprising:
   determining with the apparatus if the particular packet was known to be corrupted before being transmitted in response to receiving the negative acknowledgment; and
   if the particular packet was corrupted, re-transmitting the subsequent packets from the apparatus to the receiver without re-transmitting the particular packet after receiving the negative acknowledgment.

5. The method of claim 1, further comprising:
   sending a notification to a higher-level process in response to a determination that the number of negative acknowledgments exceeds the predefined threshold.

6. The method of claim 1, further comprising:
   sending a notification from the apparatus to the receiver in response to a determination that the number of negative acknowledgments exceeds the predefined threshold.

7. The method of claim 1, further comprising:
   blocking with the apparatus a transmission of subsequent, never-before-transmitted packets of equal or lesser priority than the particular packet before and during the re-transmission of the sequence of packets if the number of negative acknowledgments does not exceed the predefined threshold.

8. A non-transitory computer readable medium containing computer executable instructions to perform a method in an apparatus, the method comprising:
   (A) transmitting a particular packet followed by a plurality of subsequent packets from the apparatus through a network to a receiver, wherein (i) the particular packet and the subsequent packets form a sequence of packets and (ii) the particular packet as transmitted is associated with a first identification;
   (B) receiving a negative acknowledgment at the apparatus from the receiver after the sequence of packets has been sent, wherein the negative acknowledgment is associated with a second identification, the second identification indicating that the particular packet was not accepted by the receiver;
   (C) comparing the first identification with the second identification in the apparatus;
   (D) incrementing with the apparatus a number of negative acknowledgments where the comparing indicates that the first identification matches the second identification;
   (E) if the number of negative acknowledgments exceeds a predefined threshold, re-transmitting the subsequent packets from the apparatus to the receiver without re-transmitting the particular packet; and
   (F) if the number of negative acknowledgments does not exceed the predefined threshold, re-transmitting the sequence of packets with the particular packet from the apparatus to the receiver, wherein the predefined threshold (i) is stored in the apparatus and (ii) has a value based on a priority of the particular packet.

9. The non-transitory computer readable medium of claim 8, wherein the number of negative acknowledgments comprises a count of consecutive negative acknowledgments concerning the particular packet that have been received by the apparatus.

10. The non-transitory computer readable medium of claim 8, wherein the network comprises a fabric-based interconnect.

11. The non-transitory computer readable medium of claim 8, wherein the method further comprises:

determining using the apparatus if the particular packet was known to be corrupted before being transmitted in response to receiving the negative acknowledgment; and if the particular packet was corrupted, re-transmitting the subsequent packets from the apparatus to the receiver without re-transmitting the particular packet after receiving the negative acknowledgment.

12. The non-transitory computer readable medium of claim 8, wherein the method further comprises:

sending a notification to a higher-level process in response to a determination that the number of negative acknowledgments exceeds the predefined threshold.

13. The non-transitory computer readable medium of claim 8, wherein the method further comprises:

sending a notification from the apparatus to the receiver in response to a determination that the number of negative acknowledgments exceeds the predefined threshold.

14. The non-transitory computer readable medium of claim 8, wherein the method further comprises:

blocking with the apparatus a transmission of subsequent, never-before-transmitted packets of equal or lesser priority than the particular packet before and during the re-transmission of the sequence of packets if the number of negative acknowledgments does not exceed the predefined threshold.

15. A data processing system comprising:

means for transmitting a particular packet followed by a plurality of subsequent packets from the system through a network to a receiver, wherein (i) the particular packet and the subsequent packets form a sequence of packets and (ii) the particular packet as transmitted is associated with a first identification;

means for receiving a negative acknowledgment at the system from the receiver after the sequence of packets has been sent, wherein the negative acknowledgment is associated with a second identification, the second identification indicating that the particular packet was not accepted by the receiver;

means for comparing the first identification with the second identification in the system;

means for incrementing with the system a number of negative acknowledgments where the means for comparing indicates that the first identification matches the second identification;

means for re-transmitting the subsequent packets from the system to the receiver without re-transmitting the particular packet if the number of negative acknowledgments exceeds a predefined threshold; and means for re-transmitting the sequence of packets with the particular packet from the system to the receiver if the number of negative acknowledgments does not exceed the predefined threshold, wherein the predefined threshold (i) is stored in the system and (ii) has a value based on a priority of the particular packet.

16. The data processing system of claim 15, wherein the number of negative acknowledgments comprises a count of consecutive negative acknowledgments concerning the particular packet that have been received by the system.

17. The data processing system of claim 15, wherein the network comprises a fabric-based interconnect.

18. The data processing system of claim 15, further comprising:

means for determining with the system if the particular packet was corrupted prior to being transmitted in response to receiving the negative acknowledgment; and means for re-transmitting the subsequent packets without re-transmitting the particular packet from the system to the receiver after receiving the negative acknowledgment if the particular packet was corrupted.

19. The data processing system of claim 15, further comprising:

means for sending a notification to a higher-level process in response to a determination that the number of negative acknowledgments exceeds the predefined threshold.

20. The data processing system of claim 15, further comprising:

means for blocking with the system a transmission of subsequent, never-before-transmitted packets of equal or lesser priority than the particular packet before and during the re-transmission of the sequence of packets if the number of negative acknowledgments does not exceed the predefined threshold.

21. The method of claim 1, further comprising:

receiving a given negative acknowledgment at the apparatus from the receiver after the sequence of packets has been sent, wherein the given negative acknowledgment is associated with a third identification; and resetting the number of negative acknowledgments where the first identification is different than the third identification.

* * * * *